United States Patent [19]

Ogiwara et al.

[11] Patent Number: 4,468,167
[45] Date of Patent: Aug. 28, 1984

[54] METHOD OF OPERATING WATER-TURBINE OR PUMP WATER-TURBINE

[75] Inventors: Kenzyu Ogiwara, Hitachi; Tooru Osanai, Ibaraki, both of Japan

[73] Assignee: Hitachi, Ltd., Tokyo, Japan

[21] Appl. No.: 320,090

[22] Filed: Nov. 10, 1981

[30] Foreign Application Priority Data

Nov. 19, 1980 [JP] Japan ............................ 55-161950

[51] Int. Cl.³ .................... F03B 21/06; F03B 3/10
[52] U.S. Cl. .................................. 415/1; 415/26; 415/180; 415/500
[58] Field of Search ............. 415/1, 26, 47, 112, 415/180, 110, 111, 116, 170 R, 175, 176

[56] References Cited

U.S. PATENT DOCUMENTS

| 3,236,499 | 2/1966 | Chatfield et al. | 415/26 |
| 3,539,270 | 11/1970 | Derrickson | 415/1 |
| 3,574,473 | 4/1971 | Gaffal | 415/112 X |
| 3,923,417 | 12/1975 | Swiecicki | 415/110 |
| 4,047,831 | 9/1977 | Mayo et al. | 415/1 |
| 4,286,919 | 9/1981 | Yamaguchi | 415/112 |
| 4,295,781 | 10/1981 | Ogiwara et al. | 415/1 |

FOREIGN PATENT DOCUMENTS 55-54674  4/1980  Japan ............................. 415/1

*Primary Examiner*—Everette A. Powell, Jr.
*Attorney, Agent, or Firm*—Beall Law Offices

[57] ABSTRACT

A method of operating a water-turbine or a pump water turbine in which, when the runner is idling for phase modification running or stand-by running, the main machine is tripped by means of a main machine tripping circuit when the flow rate of cooling water supplied to the seal portions of the runner is maintained below a predetermined limit for a predetermined period of time. The main machine tripping circuit is excited to become operative only after the pressure around the runner comes down to a level approximating the water pressure in the draft pipe.

8 Claims, 6 Drawing Figures

METHOD OF OPERATING WATER-TURBINE OR PUMP WATER-TURBINE

BACKGROUND OF THE INVENTION

The present invention relates to a method of operating a water-turbine or a pump water-turbine and, more particularly, to a method of operating a water-turbine or a pump water-turbine having an improved controlling operation of the main turbine tripping circuit, which acts upon detection of a shortage of cooling water in the runner seal portion, which is liable to take place during no-load operation such as in the case of phase adjusting running of the water-turbine or pump water-turbine.

In general, in the operation of the hydraulic machine such as water-turbine, pump water-turbine or the like directly connected to an alternator, the water level in the runner chamber is lowered to make the runner idle to create a state called "phase modification running", in order to increase the power factor of the power line, when the power factor is lowered. It is also a common measure to conduct a so-called stand-by running of the water-turbine or the pump water-turbine to make the latter ready for the loaded running. The stand-by running is made in a manner similar to the phase modification running. There are various ways of starting of the phase modification running. According to a first method, the water level in the runner chamber is lowered while stopping the main machine consisting of the alternator and the water-turbine or the pump water-turbine, and the phase modification running is commenced after accelerating the water-turbine to the rated speed by means of a starting motor. This method is substantially the same as the ordinary pump starting method.

According to a second method, the water inlet valve is opened to fill the casing and then the guide vanes are opened to a predetermined opening degree to start the runner. The alternator is then put into the power line after the speed is increased to the rated speed. Thereafter, the guide vanes are fully closed and the water level in the runner chamber is depressed by compressed air to make the runner idle, thereby to create the state of the phase modification running.

In the first method stated above, it is rather easy to lower the water level because the main machine is not rotating. This method, however, requires a provision of a starting motor, and takes a considerably long time for starting and accelerating the main machine to the rated speed. For this reason, the second method is generally preferred to the first method.

The gaps of the runner seals between the rotating runner and the stationary parts of the upper and lower covers are small. Therefore, when the runner idles with the lowered water level in the runner chamber for the phase modification, the temperature of the runner is inconveniently raised due to the torque resistance imposed by the water from the casing side through the guide vanes. In consequence, the runner is thermally expanded to make contact with the stationary parts dangerously.

To avoid this danger, means are provided for supplying the runner seals during idling of the runner to prevent the breakdown of the runner due to contact with the stationary parts of the runner seals.

In general, the pressurized water still remains in the runner seals in the period immediately after the depression of the water level because, in such a period, the inlet valve has not been closed completely yet. It is, therefore, not necessary to supply the cooling water to the runner seals in such a period.

The conventional operation system includes a function to actuate a main machine tripping circuit upon detect of the shortage of the cooling water supplied to the runner seals. It is often experienced that the tripping circuit is undesirably activated upon detection of the shortage of the cooling water even in the above mentioned period in which the supply of cooling water is unnecessary, so that the main machine is tripped unnecessarily.

SUMMARY OF THE INVENTION

It is an object of the invention to solve the above-described problems of the prior art.

It is a further object of the invention to provide a method of operating a water-turbine or a pump water-turbine in which the main machine tripping circuit is allowed to operate only when there is a shortage of the cooling water supplied to the runner seals in the period in which the supply of the cooling water is necessary, to ensure a safe phase modification running.

To this end, according to the invention, there is provided a method of operating a water-turbine or a pump water-turbine, in which the main machine tripping circuit is activated at an instant at which the pressure around the runner has come down to a level near the draft hydraulic pressure, the moment being detected directly or indirectly, thereby to avoid unnecessary tripping of the main machine.

The above and other objects, as well as advantageous features of the invention will become clear from the following description of the preferred embodiment taken in conjunction with the accompanying drawings.

DESCRIPTION OF THE PREFERRED EMBODIMENT

Figure 1:
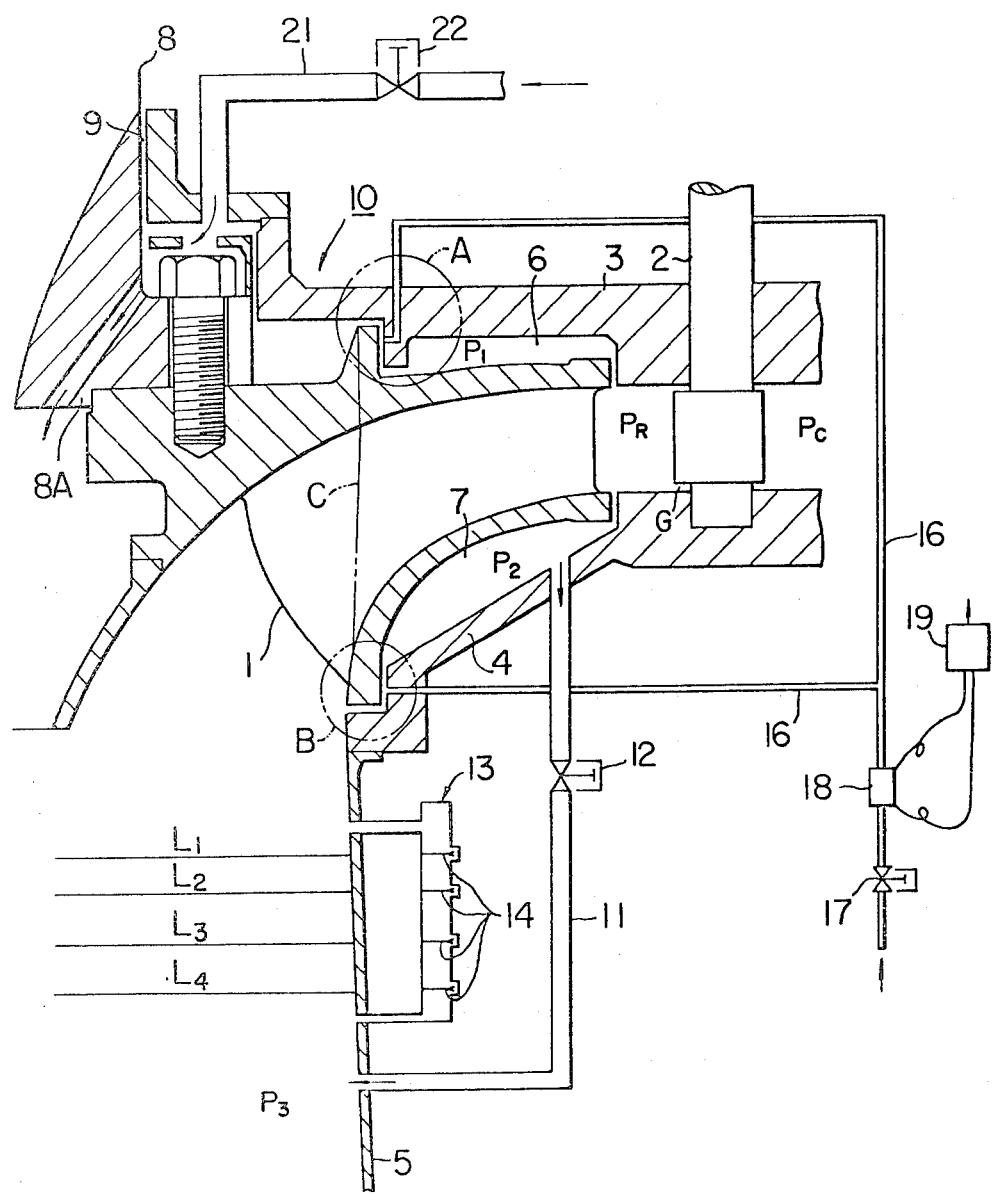
FIG. 1 is a fragmentary sectional view of an ordinary water-turbine or a pump water-turbine.

Referring first to FIG. 1 which is a fragmentary sectional view of a water-turbine 10 or a pump water-turbine, a runner 1 is carried by a main shaft 8, and is disposed between an upper cover 3 and a lower cover 4. Reference numerals 2 and 5 denote, respectively, a guide vane and a draft pipe. A back pressure chamber 6 is formed between the runner 1 and the upper cover 6 while a side chamber 7 is formed between the lower cover 4 and the runner 1.

An air supply pipe 21 having an air inlet valve 22 is attached to the portion of the upper cover 3 near the main shaft 8. The air supply pipe 21 supplies compressed air to the space beneath the runner 1 via apertures 8A provided in the main shaft 8, thereby to lower the water level in the draft pipe 5 to a level below the runner thereby to make the runner 1 idle.

A leak-water discharge pipe 11 is formed in the portion of the lower cover 4 opposing to the peripheral portion of the runner 1 so as to open to the side chamber 7. The leak-water discharge pipe 11 is connected to the draft pipe 5 via a leak-water discharge valve 12 which is adapted to be opened when the runner 1 is idling. Furthermore, a water level detector 13 for detecting the water level depressed by the compressed air is provided in the draft pipe 5. The water level detector 13 includes four electrodes 14 positioned at different levels $L_1$ to $L_4$. The uppermost level $L_1$ is an alarming level. Namely, in the case where there is leakage of air through the water seal 9 of the main shaft 8, the water level once depressed by the compressed air is raised again to contact the idling runner 1. To avoid this, when the water level has been raised again to the level $L_1$, the water level detector produces a signal for alarming and for tripping the main machine. The second water level $L_2$ is a level corresponding to the latter condition for activating the main machine tripping circuit. The third water level $L_3$ is a level for opening the air inlet valve 22 to introduce the compressed air again into the runner chamber when the water level once depressed by the compressed air is raised accidentally to this level, as in the case of the uppermost level $L_1$. The fourth water level $L_4$ is the level for closing the air inlet valve. Namely, supplying of compressed air is stopped when the water level is depressed and lowered to this level $L_4$.

Runner seals are formed between the runner 1 and the stationary parts of the upper and lower covers 3, 4 as indicated at A and B in FIG. 1. Since only small clearances are preserved in these seals, it is necessary to prevent any thermal expansion of the runner 1, for otherwise the expanded runner may be broken due to a contact with the upper and lower covers 3, 4. To this end, a cooling water supply pipe 16 connected to a water supply pump is communicated with the runner seals A and B. The water supply pipe 16 is provided with a water supply inlet valve 17 adapted to permit the supply of the cooling water to the runner seals A, B upon receipt of an opening instruction.

Supplying of cooling water is made in the idle state of the runner in which the water level has been lowered below the runner 1. The rate of supply of cooling water is detected by a flow meter 18 disposed in the water supply pipe 16. A main machine tripping circuit 19 connected to the flow meter 18 is adapted to trip the main machine when the flow rate is maintained below a predetermined limit value for a predetermined time period $T_1$, so that the accidental contact of the runner 1 with the stationary parts, due to the thermal expansion of the runner 1, is avoided.

Figure 2:
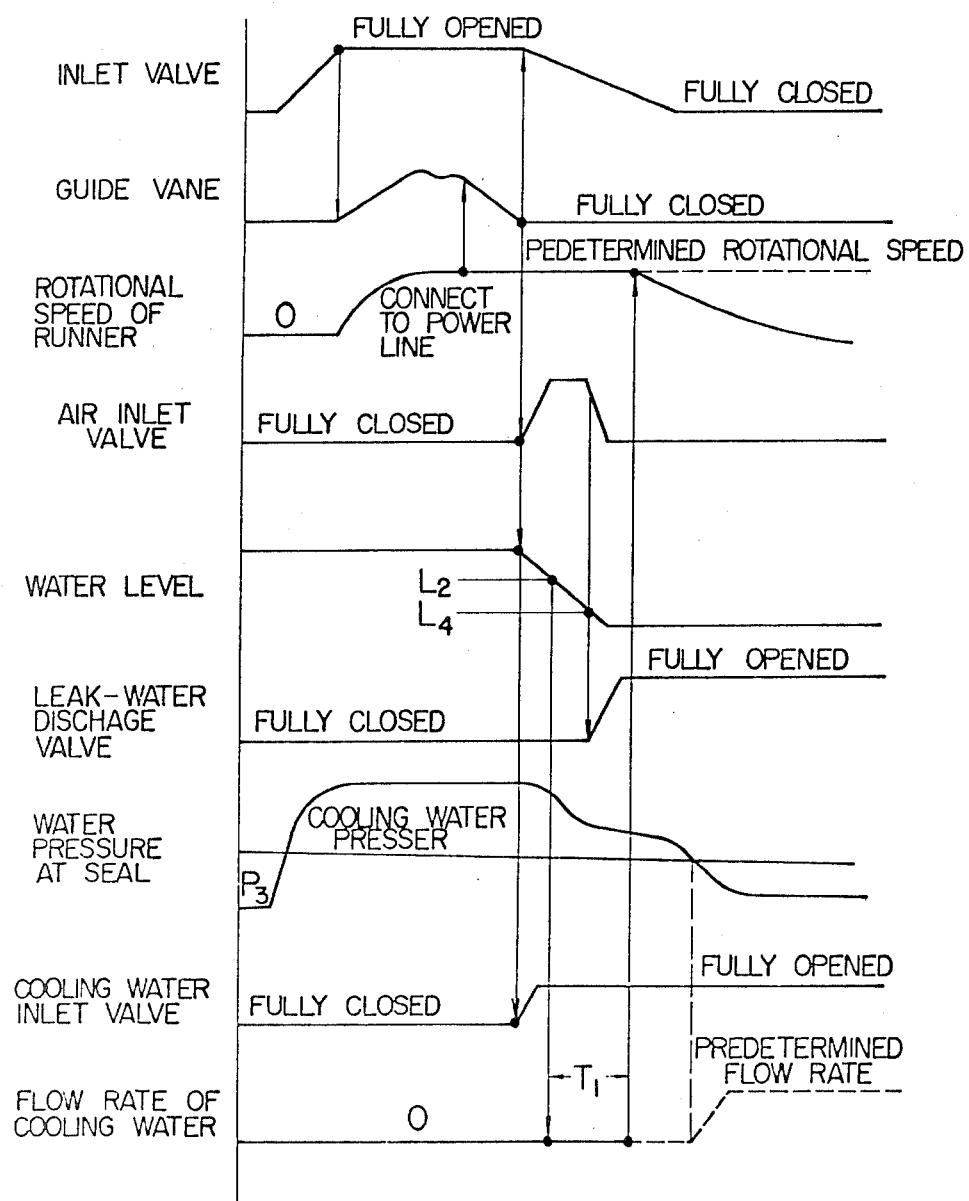
FIG. 2 is an operation diagram for operating a water-turbine or a pump water-turbine in accordance with a conventional method.

FIG. 2 is an operation diagram of a conventional operation method for water-turbine or pump water-turbine. According to the conventional method, as will be seen from FIG. 2, the water-turbine or the pump water-turbine is started by gradually opening the main water inlet valve (shown at 24 in FIG. 6) that leads to guide vane 2, while the guide vanes 2 are fully closed, and the guide vanes 2 are partially opened to start the runner 1 after the full opening of the water inlet valve. As the runner is accelerated to a predetermined rated speed, the air inlet valve 22 is opened to supply compressed air into the runner chamber when the guide vanes 2 are fully opened, thereby to lower the water level in the runner chamber. At the same time, the cooling water inlet valve 17 is opened and the main water inlet valve starts to be closed.

When the water level is depressed by compressed air during rotation of the runner 1, since the water has a greater specific weight then the air, the water in the runner chamber is forced to move radially outwardly by the centrifugal force imparted by the runner 1 to stay in the peripheral portion of the runner 1, as indicated by C in FIG. 1. Therefore, the water level is lowered in the initial stage only in the central region of the runner chamber. Such lowering of the water level is detected by the electrode 14 disposed at the aforementioned level $L_4$. The water residing in the peripheral portion of the runner 1, together with the water leaking from the casing side through the side gap G of the guide vanes, acts to increase the idling torque of the runner 1.

Therefore, the leak-water discharge valve 12 is opened at an instant at which the water level has become low to discharge the pressurized water from the periphery of the runner to reduce the pressure around the runner and the idling torque.

Supplying of cooling water to the runner seals A, B is made by opening the cooling water inlet valve 17 of the cooling water supply pipe 16, at the moment at which the guide vanes 2 are fully closed. The pressure of cooling water needs only to be somewhat greater than the water pressure $P_3$ in the draft pipe. More specifically, the pressure of the cooling water is usually selected to be about 5 Kg/cm² higher than the water pressure $P_3$ in the draft pipe.

In order to avoid the dangerous contact between the idling runner 1 and the stationary parts of the upper and lower covers due to insufficient supplying of cooling water, the flow rate of cooling water is measured by the flow meter 18, and the main machine tripping circuit connected to the flow meter 18 is energized by the signal from the electrode 14 disposed at the level $L_2$. As stated before, the main machine tripping circuit 19 is adapted to trip the main machine when the cooling water supply rate is maintained below a predetermined limit value for a predetermined period $T_1$.

Generally, the main water inlet valve of a large-capacity water-turbine or pump water-turbine is operated gradually, in order to avoid the unfavourable water hammering action. Usually, it takes about one minute for the main water inlet valve to be moved from the fully opening position to the fully closed position.

In the conventional method of operating a water-turbine or pump water-turbine, as will be seen from FIG. 2, the water inlet valve has not been fully closed yet immediately after the completion of depression of the water level. At this moment, therefore, the pressure $P_c$ at the side of the guide vanes adjacent to the casing is still high, so that there is some leakage of water from this side of the guide vanes 2 through the side gap G. In addition, as stated before, there is a large amount of water residing in the peripheral portion of the runner. The leaking water and the residual water cause a rise in the priming water pressure $P_R$ between the runner 1 and the guide vanes 2, as well as the side pressure $P_2$ in the side chamber and the back pressure $P_1$ in the back pressure chamber 6.

For these reasons, in the current machines operating at a large water head, the back pressure $P_1$ and the side pressure $P_2$ are considerably high as compared with the draft water pressure $P_3$, at the moment immediately after the completion of depression of the water level. This in turn causes a rise of the pressures in the runner seals A and B. As will be understood from FIG. 2, the pressures in the runner seals A, B are higher than the normal cooling water supply pressure ($P_3 +5$ Kg/cm$^2$) until the water inlet valve is completely closed, so that no cooling water is supplied to the runner seals A, B even though the inlet valve 17 is opened. As stated before, the main machine tripping circuit is excited at the moment at which the water level has come down to the level $L_2$ and acts to stop the main machine because the flow rate of cooling water measured by the flow meter 18 does not come up to the level higher than the predetermined limit even after the lapse of the predetermined time length $T_1$. However, in this period, the pressures in the runner seals A, B are still high and there is a large amount of water residing in these runner seals A, B, so that it is not necessary to supply the cooling water. Thus, in the conventional operation method, it is often experienced that the main machine is unnecessarily tripped due to the activation of the main machine tripping circuit merely by the detection of insufficient flow rate of the cooling water, even though supplying of cooling water is not necessitated.

This problem is completely overcome by the operation method of the invention as will be fully understood from the following description of the preferred embodiments taken in conjunction with the accompanying drawings. The construction and arrangement of the water-turbine or the pump water-turbine to which the method of the invention is applied is identical to that shown in FIG. 1.

Figure 3:
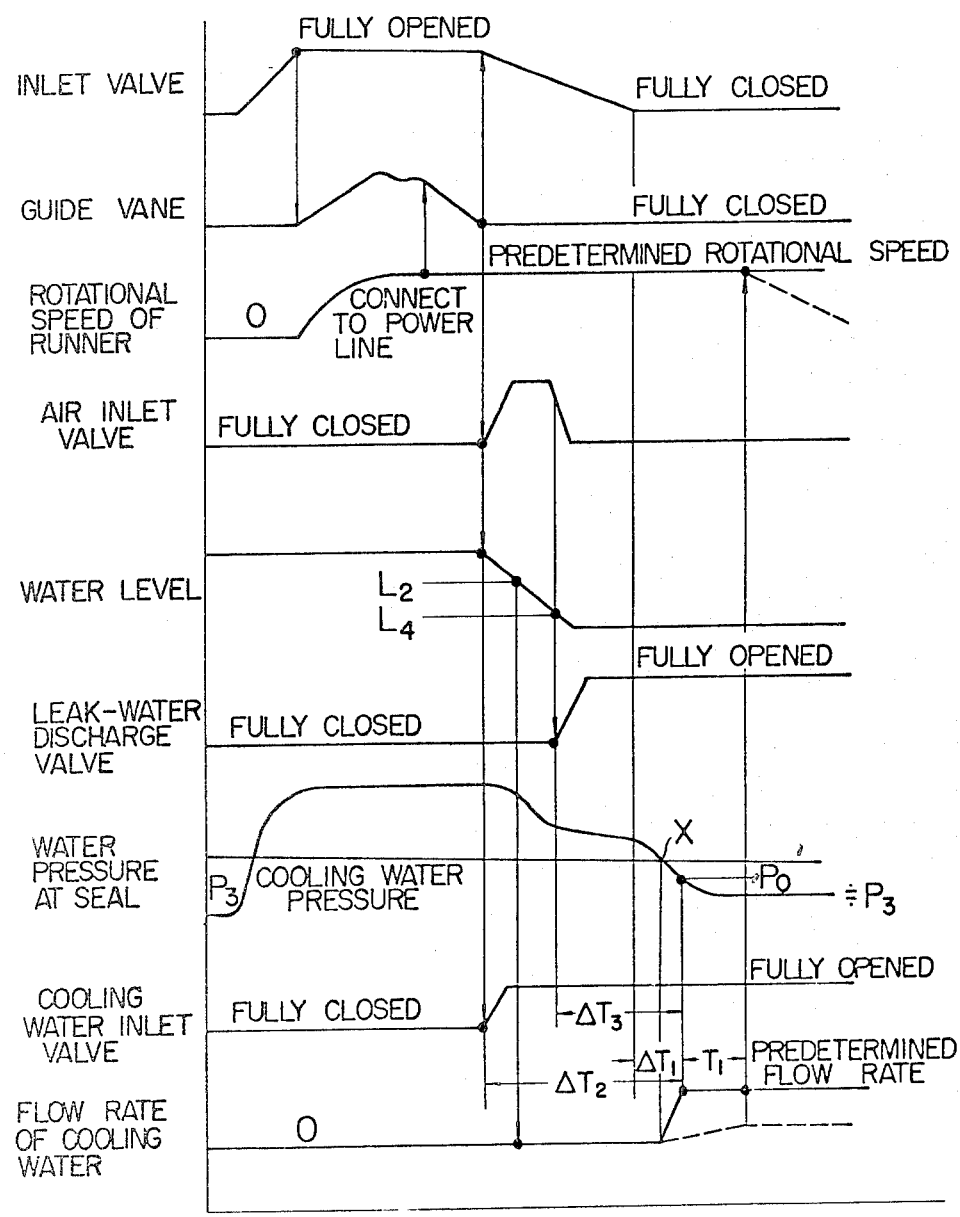
FIG. 3 is an operation diagram for operating a water-turbine or a pump water-turbine in accordance with a method of the invention.

Referring to FIG. 3 showing the operation diagram of the operating method in accordance with a first embodiment of the invention, the water main inlet valve is opened upon receipt of an instruction for the phase modification running to increase the pressure in the casing. Then the guide vanes 2 are opened to the no-load opening degree of about 15%. As a result of the opening of the guide vanes 2, the pressurized water in the casing starts to drive the runner 1. In consequence, the alternator connected directly to the main shaft 8 to which the runner 1 is fixed is accelerated to the rated speed to become ready for the loaded operation. Then, a circuit breaker is closed to connect the alternator to the power line. Thereafter, the closing operation of the guide vanes 2 is commenced and, when the guide vanes 2 are fully closed, the air inlet valve 22 and the cooling water supply valve 17 are opened, while the water inlet valve starts to close. As a result of the opening of the air inlet valve 22, the compressed air is supplied into the runner chamber to depress the water level in the latter downwardly. At the moment at which the depressed water level is lowered to the aforementioned air inlet valve closing level $L_4$, the air inlet valve 22 is closed and the leak-water discharge valve 12 is opened.

The priming pressure $P_R$ as the pressure around the periphery of the runner 1 is lowered to some extent as a result of the depression of the water level in the runner chamber to the level below the runner 1 by the compressed air. In this state, however, the runner 1 is still rotating so that water is displaced radially outwardly by the centrifugal force produced by the rotation of the runner 1 and is made to stay in the peripheral part of the runner. In addition, the pressure on the side of the guide vanes adjacent to the casing is still high to cause leakage of water through the side gap G of the guide vanes. In consequence, a considerably high pressure is maintained at the outer side of the runner 1. Therefore, the pressure of cooling water is still lower than the priming pressure $P_R$, so that no cooling water is supplied to the runner seals A and B even though the cooling water inlet valve 17 is opened. In this state, however, no thermal expansion of the runner 1 and, hence, no contact of the runner 1 with the stationary parts takes place, due to the presence of the residual water in the runner seals A, B and leakage of the water into these seals.

As the water inlet valve is fully closed in this state, the pressure on the casing side is drastically lowered so that leakage of water through the side gap G of the guide vanes 2 is decreased, resulting in a drastic reduction in the priming pressure $P_R$ as the pressure in the periphery of the runner 1, as well as in the back pressure $P_1$ and the side pressure $P_2$. Simultaneously, the pressures in the runner seals A, B are lowered. As the pressure in the runner seals A, B come down below the cooling water supply pressure which is 5 Kg/cm$^2$ higher than the draft water pressure $P_3$ and which is represented by X in FIG. 3, cooling water is allowed to come into the runner seals A, B because the cooling water inlet valve 17 has been opened since the time of full closing of the guide vanes. Such supplying of cooling water well compensate for reduction in the cooling effect of the residual water in the seals A, B to effectively prevent the expansion of the runner 1 during the idling.

Thus, it is possible to obtain a flow rate of cooling water greater than the aforementioned predetermined limit, once the pressures in the runner seals A, B are lowered substantially to the level of the draft pressure $P_3$ below the supply pressure of the cooling water. According to the invention, the main machine tripping circuit 19 is excited only after the establishment of the condition stated above, so that it is possible to avoid any accidental contact of the runner 1 with stationary parts due to insufficient supplying of cooling water, without the fear of the accidental tripping of the main machine in the period in which supplying of cooling water is not necessary.

Figure 4:
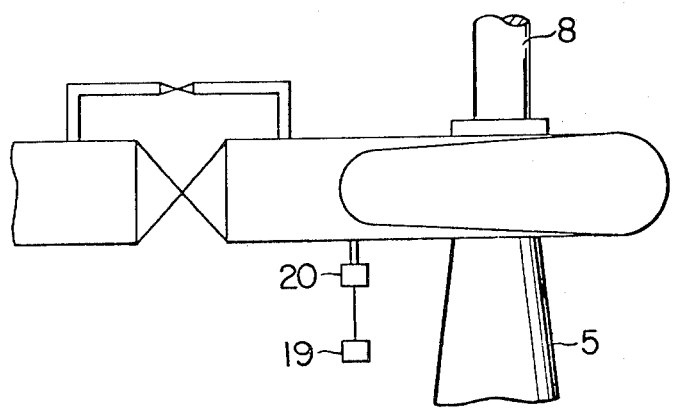
FIG. 4 is a schematic side elevational view of an apparatus for use in carrying out the method in accordance with a first embodiment of the invention.

FIG. 4 shows an apparatus suitable for use in carrying out the method of the invention stated hereinbefore. The apparatus includes a pressure detector 20 adapted to directly detect the priming pressure $P_R$ in the periphery of the runner. The main machine tripping circuit 19, which is connected to the flow meter 18 in the cooling water supply pipe 16, is connected also to the pressure detector 20. The pressure detector 20 is adapted to produce a signal for exciting the main machine tripping circuit 19 when the priming pressure $P_R$ detected by this detector has come down below the cooling water pressure and to a pressure $P_o$ approximating the draft water pressure $P_3$.

The pressure $P_o$ at which the main machine tripping circuit 19 is excited needs only to be a pressure which permits the cooling water flowing through the cooling water inlet valve 17 to flow at a flow rate greater than the predetermined limit, and is determined in accordance with the response characteristics of the valve 17. The main machine tripping circuit 19, therefore, does not operate in such a state that the priming pressure $P_R$ is still high enough to eliminate the necessity for supplying of cooling water, but becomes operative only after the establishment of such a condition that a cooling water flow rate greater than the predetermined value is obtained following the reduction of the pressures in the runner seals A, B down to such levels as necessitating supplying of cooling water. In other words, the main machine tripping circuit 19 becomes operative only after supplying of cooling water is commenced, to safely act to trip the main machine only in the event of any abnormality in the cooling water supply, but never trips the main machine for the reason of shortage of cooling water in the period in which supplying of cooling water is not necessary.

Figure 5:
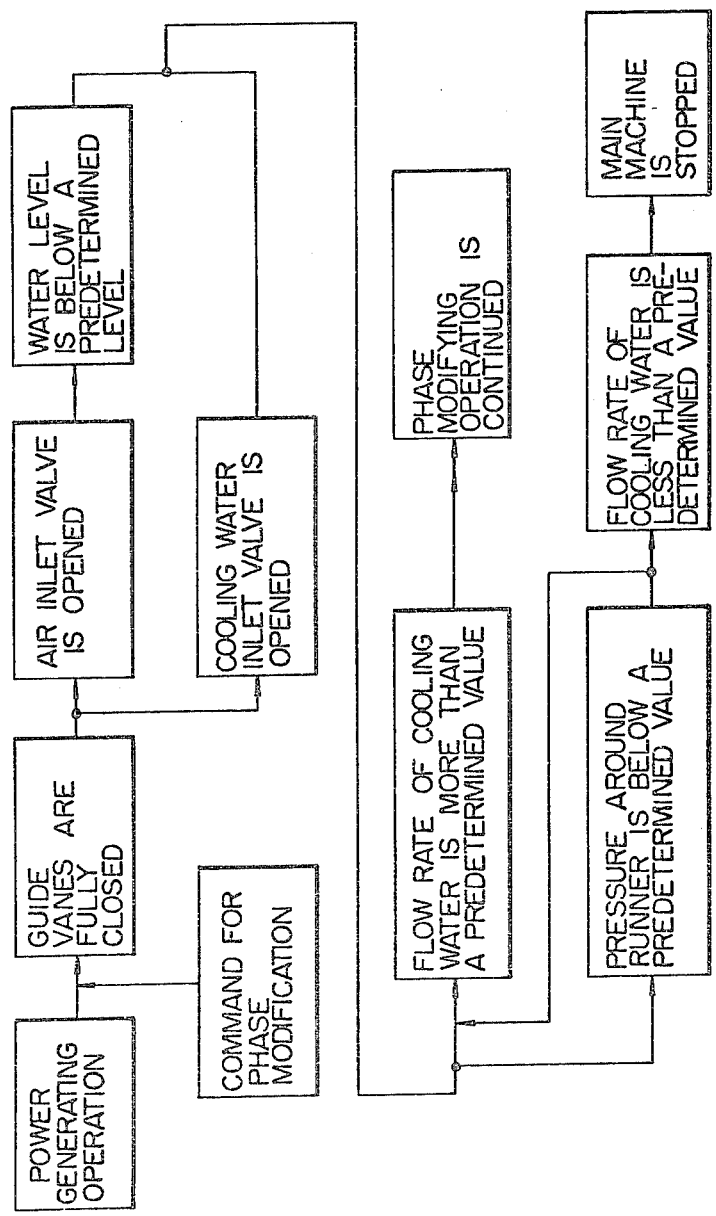
FIG. 5 is a block diagram of the method of operating a water-turbine or a pump water-turbine in accordance with the invention.

This operation will be more clearly understood when considered in conjunction with FIG. 5 which shows a block diagram of this operation. Namely, it will be understood that, after the commencement of the phase running of the main machine, the guide vanes 2 are fully closed and the water level in the runner chamber is lowered by the compressed air. At the same time, the cooling water inlet valve 17 is opened to become ready for supplying the cooling water to the runner seals, A, B. Then, the pressure around the runner is detected and the main machine tripping circuit is excited when the detected pressure has come down below the predetermined pressure $P_o$. The phase modification running is continued if the flow rate of cooling water measured by the flow meter 18 is greater than the predetermined value. However, if the flow rate of cooling water accidentally comes down below the predetermined limit, the main machine tripping circuit acts to stop the main machine.

Figure 6:
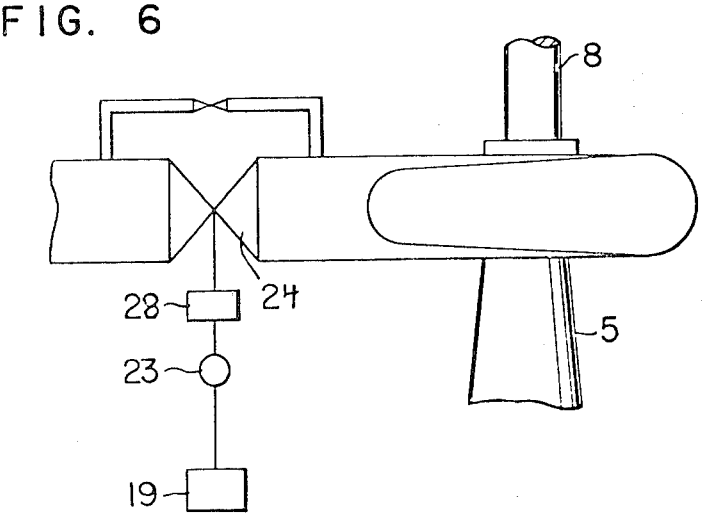
FIG. 6 is a schematic side elevational view of an apparatus for use in carrying out the method in accordance with a second embodiment of the invention.

FIG. 6 shows another apparatus for carrying out the method of the invention. In the operation of this apparatus, the pressure around the runner is determined indirectly on an assumption that the pressure $P_o$ at which the main machine tripping circuit is excited is reached after lapse of a time period $\Delta T_1$ from the moment of full closing of the water inlet valve. The main machine tripping circuit 19 may be excited at the moment of the full closing of the water inlet valve. In the apparatus shown in FIG. 6, the main water inlet valve 21 has a valve opening detector 22 adapted to detect the opening degree of this valve 21. The detector 22 is connected to the main machine tripping circuit 19 through a timer 23. The main machine tripping circuit 19 is adapted to cut the electric circuit of the main machine when the flow rate of cooling water is decreased to a level below the predetermined limit. Thus, in this apparatus, the full closing of the water inlet valve 21 is detected by the valve opening detector 22 and, after lapse of the predetermined period of time $\Delta T_1$ which may be zero, the main machine tripping circuit 19 is energized to become operative through the timer 23. The main machine tripping circuit 19 then acts to trip the main machine if the predetermined flow rate of cooling water is not reached within a predetermined time $T_1$ as shown in FIG. 3. It is noted that this arrangement is quite simple as the device for energizing the main machine tripping circuit 19.

In still another apparatus (not shown) for carrying out the method of the invention, it is presumed that the pressure around the runner reaches the aforementioned pressure $P_o$ for exciting the main machine tripping circuit 19, after lapse of a predetermined period of time $\Delta T_2$ from the moment of full closing of the guide vanes or after lapse of a time period $\Delta T_3$ from the moment of completion of lowering of the water level down to the level $L_4$. (See FIG. 3)

As has been described, according to the method of operating a water-turbine or a pump water-turbine in accordance with the invention, it is possible to obtain a safe and stable idling of the main machine due to the adequate control of timing of the energization of main machine tripping circuit for tripping the main machine in the event of shortage of the cooling water, while avoiding unnecessary tripping of the main machine in the period in which supplying of cooling water is not necessary.

What is claimed is:

1. A method of operating a water-turbine or a pump water-turbine machine, comprising the steps of:
   supplying cooling water to the runner seals of the machine during idling of the runner of the machine;
   tripping the machine to discontinue idling by an excited main machine tripping circuit when the flow rate of cooling water is maintained below a predetermined limit for a predetermined period of time; and
   exciting the machine tripping circuit to make it operative only when the pressure around the runner reaches a level approximating the pressure in the draft pipe of the machine so that said step of tripping does not occur at higher pressures.

2. A method according to claim 1, wherein said step of exciting includes detecting the pressure around the runner directly by means of a pressure detector so that the machine tripping circuit is excited when the pressure detected by the pressure detector has reached the level approximating the pressure in the draft tube.

3. A method according to claim 1, wherein said step of exciting occurs in response to the water inlet valve for the machine being fully closed on the assumption that the pressure around the runner reaches the level approximating the pressure in the draft tube at such time.

4. A method according to claim 3, wherein said step of exciting occurs after the lapse of a predetermined period of time from the full closing of the water inlet valve.

5. A method according to claim 1, wherein said step of exciting occurs in response to the guide vane for the machine being fully closed on the assumption that the pressure around the runner reaches the level approximating the pressure in the draft tube at such time.

6. A method according to claim 5, wherein said step of exciting occurs after the lapse of a predetermined period of time from the full closing of the guide vane.

7. A method according to claim 1, wherein said step of exciting occurs in response to the depression of the water level in the runner chamber of the machine reaching a level below the runner, and includes the step of detecting the water level in the runner chamber at least during depression of the water.

8. A method according to claim 7, wherein said step of exciting occurs only after a lapse of a predetermined period of time from the depression of the water level in the runner chamber reaching a level below the runner.

* * * * *